United States Patent [19]

Lawrence et al.

[11] 4,195,467

[45] Apr. 1, 1980

[54] HARVESTING MACHINES

[75] Inventors: Ernest R. Lawrence; Thomas L. Bradley, both of Morawa, Australia

[73] Assignee: Robert George Frean, Lesmurdie, Australia

[21] Appl. No.: 862,136

[22] Filed: Dec. 19, 1977

[30] Foreign Application Priority Data

Dec. 20, 1976 [AU] Australia .................. PC8544

[51] Int. Cl.$^2$ ............................................. A01D 75/00
[52] U.S. Cl. .................................... 56/296; 56/314
[58] Field of Search ........................... 56/296–299, 56/312–314, 119, 257

[56] References Cited

U.S. PATENT DOCUMENTS

| 589,439 | 9/1897 | Loger | 56/299 |
| 2,492,290 | 12/1949 | Isserstedt | 56/296 |
| 2,687,000 | 8/1954 | Valentine | 56/299 |

FOREIGN PATENT DOCUMENTS

| 170517 | 2/1952 | Fed. Rep. of Germany | 56/314 |
| 156284 | 9/1956 | Sweden | 56/296 |

*Primary Examiner*—Jay N. Eskovitz
*Attorney, Agent, or Firm*—Ernest A. Beutler

[57] ABSTRACT

An improvement to a harvesting machine where the harvesting machine comprises a substantially horizontal elongate cutter comprising a cutting member mounted in association with a base member for relative longitudinal reciprocatory action of one with respect to the other. The improvement comprising a feed device consisting of a plurality of elongate planar strips of flexible resilient material mounted at one end and in spaced relation along the elongate cutter to reciprocate along an axis parallel to the elongate cutter. The strips being mounted such that their plane is substantially perpendicular to that of the cutter and they extend rearwardly of the cutter, wherein the free end of the strip can swing freely with the reciprocation of the cutting member to sweep material cut by the cutter rearwardly from the cutter.

6 Claims, 4 Drawing Figures

HARVESTING MACHINES

BACKGROUND OF INVENTION

This invention resides in an improvement to harvesting machines for crops. The invention particularly relates to those harvesting machines utilising a horizontally disposed reciprocatory cutter bar mounted in reciprocatory relation to a comb-like structure.

It has been determined that where harvesting machines utilising a cutter as described above is used to harvest grain crops under normal growth conditions the collection of the cut grain heads is facilitated by the continuous flow of material through the cutter. However in a case where the machine is required to harvest a crop having a low yield the flow of material from the cutter is not sufficient to produce a steady flow. Rather the cut material tends to lie in the region where it has been cut to ultimately fall from the cutters to the ground or to build up until it has enough bulk to move to the machines conveying means. The resultant effect of the last situation results in ineffective grain separation from the cut material due to the irregular nature of the feed.

A similar problem to the above exists with harvesters used to cut and collect crop material having inherently low flow tendancies. Such crop materials include those consisting of large seeds and pods or grain heads such as soya beans, sunflowers, lupins and the like crops.

SUMMARY OF THE INVENTION

It is an object of this invention to provide a means in association with the cutter of a harvesting machine to induce flow of cut material away from the cutter to the conveying means of the machine.

In one form the invention resides in an improvement to harvesting machines where the harvesting machine comprises a substantially horizontal longitudinal cutter comprising a toothed cutting member mounted in association with a comb-like base member for longitudinal reciprocatory motion in relation to the base member, said improvement comprising a feed means consisting of an elongate resilient planar flap mounted at one end to the cutter to reciprocate with it, and such that its plane is substantially perpendicular to that of the cutter and it extends rearwardly of the cutter and such that its free end can swing with reciprocation of the cutter to sweep material cut thereby rearwardly.

The invention will be more fully understood in the light of the following description of one specific embodiment. The description is made with reference to the accompanying drawings of which:

Figure 1:
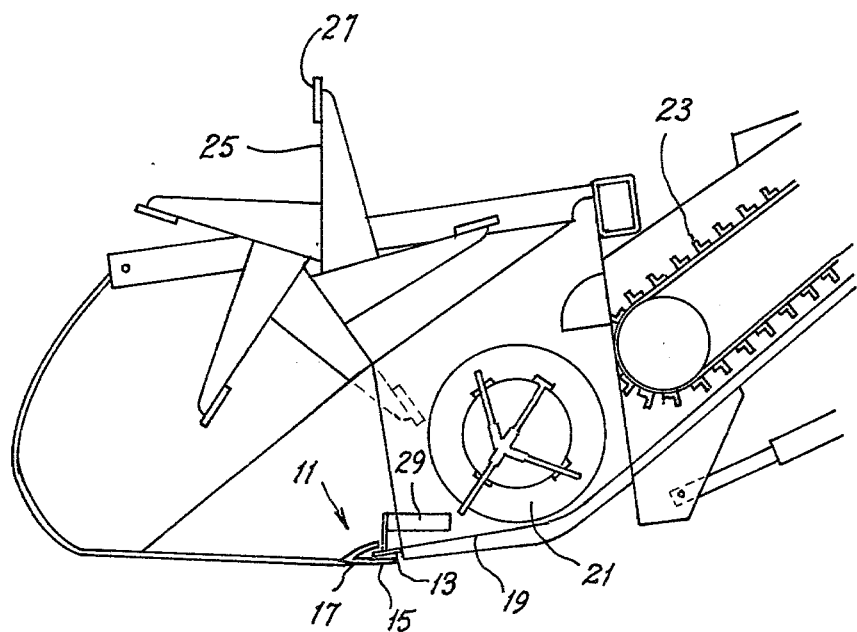
FIG. 1 is a part sectional elevation of a grain harvester incorporating the embodiment of the improvement.
Figure 2:
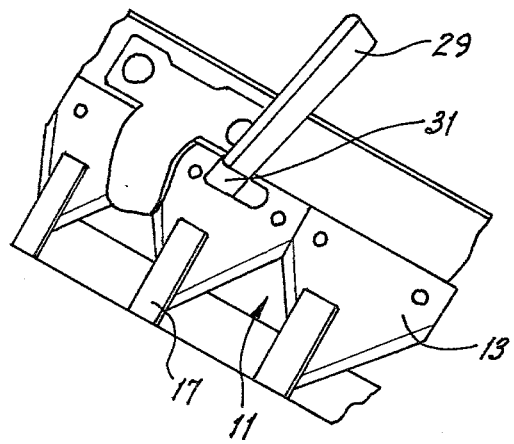
FIG. 2 is a perspective plan view of a portion of the cutter assembly of the grain harvester of FIG. 1.

The embodiment is directed to an improvement to a header for the harvesting of grain. As shown in the drawings the header comprises a cutter assembly 11 consisting of a reciprocatory cutter 13 having a serrated or toothed cutting face, and a base member 15 having a series of spaced rearwardly projecting fingers 17 which extend beyond the front cutting edge of the cutter 13 to lie at least partially above and below the cutter 13. The action of the cutter is to cut the grain stalks below the grain head by a shearing action between the fingers 17 and the cutter 13. The cutter assembly 11 extends substantially the full width of the machine and is associated at its rear with a platform 19 leading to an auger conveyor 21 positioned parallel to the cutter assembly and intended to carry the grain heads to one side of the platform to be carried by another conveyor 23 to the grain separation portion of the machine (not shown). The cutter assembly 11 is also associated with a reel 25 located forward and above the plane of the cutter assembly but parallel thereto.

The reel 25 is provided with a series of circumferentially spaced beaters 27 which extend substantially the full width of the cutter assembly and serves in guiding the grain stalks to the cutter assembly 11. However it should be appreciated that the embodiment is equally applicable to a header not having a reel 25.

The guiding means 29 of the embodiment comprises a set of spaced lengths of strip of resilient material which are fixed at one end to the cutter bar and extend rearwardly from the cutter 13 such that the plane of the strip is perpendicular to that of the cutter assembly 11 and platform 19. The guiding means 29 are mounted to the cutter 13 by means of mounting member 31 which can be formed integrally or bolted or welded on the cutter. The mounting member 31 is formed as an inverted U-shaped portion 33 having a flange 35 formed at least one free end of the U-shaped portion where the flanges 35 provide the means of attachment to the cutter 13 and the U-shaped portion 33 clampingly receives the end of the strip 29. Further fixing between the mounting member 31 and the strip 29 may be used to positively lock the strip 29 in to place. Such additional fixing means may take the form of the bolts or like conventional means or a moulded configuration at the end of the strip which is engaged by the mounting member 31. The strip 29 of the embodiment is formed of a multi-ply fabric reinforced rubber sheeting having inherent resilience such that it can flex with reciprocation of the cutter 13. However the strip may be formed of any other suitable resilient flexible material. The flexibility of the strip is determined by the degree of flexing of the strip which is required to achieve the object of the invention.

Figure 3:
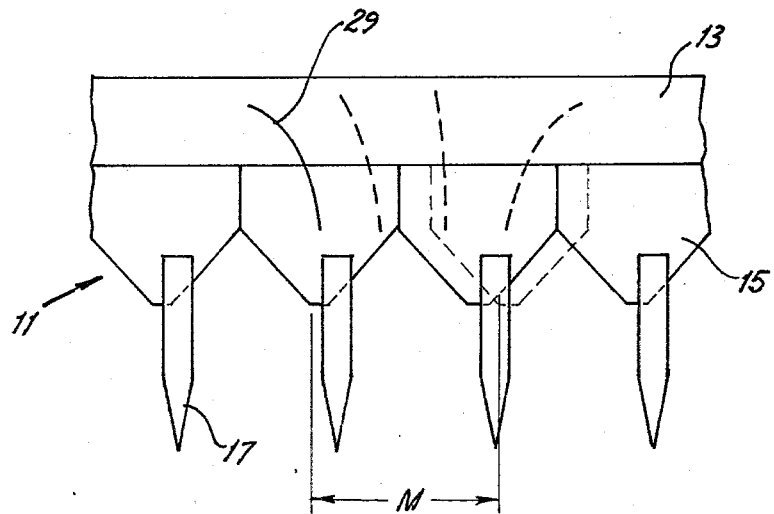
FIG. 3 is a plan view of a portion of the cutter assembly of FIG. 2 showing the action of the embodiment of the improvement.
Figure 4:
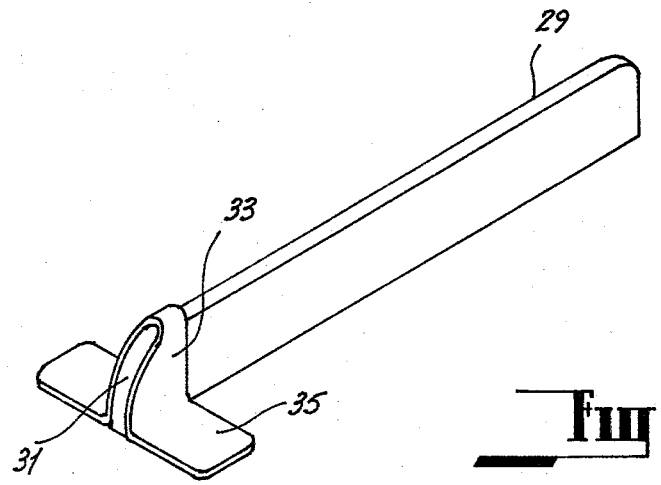
FIG. 4 is a perspective view of a flap according to the embodiment.

The action of the guide means 29 of the embodiment is shown in FIG. 3 where M represents the degree of reciprocation of the cutter 13 and the action of the guide means 29 is shown for one stroke from left to right between the two extremes of reciprocation. As the cutter 13 changes its direction of movement the free end of the strip 31 continues on in the same direction due to the inertia of the strip and its inherent flexibility. As the free end of the strip takes on the same direction of movement as the cutter it sweeps across the area of the platform 19 behind the cutter 13 to throw the cut material it encounters in a laterally and rearwardly direction. The resultant effect of the strips is to convey cut material away from the cutter 13 to the rear of the platform 19 and thus to the auger conveyor 21.

It is believed that the strips 29 would make little difference to the flow of material from the cutter 13 to the auger 21 under good crop conditions. However under low yield conditions it has been established that the strips 29 enhance the flow of material from the cutter 13 to the auger 21. The northern wheat growing areas of Western Australia and in particular the wheat growing area around Morawa have suffered in 1977 from drought conditions and as a result the normal wheat production for the area has dropped from 4 or 5 bags to the acre to less than 1 bag to the acre (1 bag contains approximately 3 bushels of wheat). Under such conditions a conventional harvesting machine has been found unable to harvest what crop there is. It would appear that such failure is due to the low flow of material from the cutter which is insufficient to maintain the flow to the auger. As a result the cut material lies on the platform 19 behind the cutter assembly 11 where it falls forwardly from the platform on to the ground. Alternatively the cut material collects on the platform and then because of its bulk moves rearwardly to the auger to be carried to the grain separation portion of the machine which because of the sudden influx of a large amount of material cannot treat such material effectively.

However when the improvement as set down in this embodiment was made to a conventional harvesting machine there was little difficulty in collecting the small amount of grain that was available under the same drought conditions. As a result of the improvement the cut material was caused to flow continuously from the cutters to the auger and there was no collection of the cut material on the platform 11. Thus the amount of material which fell from the platform was reduced and the flow of material to the grain separation portion of the machine was maintained relatively constant.

It is anticipated that the embodiment could also be applied to harvesters for crop material consisting of large seeds, pods or seed heads which have a low inherent low flow property. Such crops include sunflower, soya beans, lupins and like crops.

We claim:

1. An improvement to a harvesting machine where the harvesting machine comprises a cutter having a path of feeding movement, said cutter comprising first and second cutting members each having respective cutting edges, said cutting members being mounted on the harvesting machine for reciprocatory movement of said cutting members relative to each other between a non-cutting position wherein said cutting edges define at least one opening into which material to be harvested moves as said cutter traverses said path of feeding movement and a cutting position wherein said cutting edges cooperate to cut said material, said improvement comprising feeding means for moving material which has been cut by said cutting edges in a direction having a component opposite to said path of feeding movement, said feeding means comprising at least one planar strip of flexible material, and means for fixing each strip at a point thereon relative to one of said cutting members for movement therewith, each said strip having a cantilevered portion extending from said point, each said strip having sufficient resilience to effect flexure of said cantilivered portion about said point upon relative movement of said cutting members for sweeping a path having a component perpendicular to the direction of relative movement of said cutting members and opposite to said path of feeding movement for feeding material cut by said cutting edges in a direction having a component opposite to said path of feeding movement.

2. An improvement as set forth in claim 1 wherein said second cutting member is fixed relative to the harvesting machine and said first cutting member reciprocates relative to said second cutting member.

3. An improvement as set forth in claim 2 wherein each said strip is fixed directly to said first cutting member.

4. An improvement as set forth in claim 2 wherein said point on each said strip comprises one end of the strip, and said fixing means comprises means for engaging said one end and means for mounting said fixing means to said first cutting member.

5. An improvement as set forth in claim 4 wherein said engaging means comprises an inverted U-shaped portion for clampingly engaging said one end, and said mounting means comprising a flange on said U-shaped portion for mounting said U-shaped portion to said first cutting member.

6. An improvement as set forth in claim 1 wherein each said strip is formed from multi-ply fabric reinforced rubber sheeting.

* * * * *